(12) United States Patent
Choe et al.

(10) Patent No.: US 8,473,929 B2
(45) Date of Patent: Jun. 25, 2013

(54) ARCHITECTURE TAILORING SYSTEM

(75) Inventors: Howard C. Choe, Southlake, TX (US);
Dewey R. Myers, Plano, TX (US);
Clifford C. Sammons, Rowlett, TX (US); Larry R. Splitter, Garland, TX (US)

(73) Assignee: Raytheon Company, Waltham, MA (US)

( * ) Notice: Subject to any disclaimer, the term of this patent is extended or adjusted under 35 U.S.C. 154(b) by 995 days.

(21) Appl. No.: 12/512,632

(22) Filed: Jul. 30, 2009

(65) Prior Publication Data

US 2010/0115499 A1  May 6, 2010

Related U.S. Application Data

(60) Provisional application No. 61/137,592, filed on Jul. 31, 2008.

(51) Int. Cl.
*G06F 9/45* (2006.01)
(52) U.S. Cl.
USPC .......................................... 717/137; 717/106
(58) Field of Classification Search
None
See application file for complete search history.

(56) References Cited

U.S. PATENT DOCUMENTS

| | | | |
|---|---|---|---|
| 6,330,569 B1 | 12/2001 | Baisley et al. | |
| 6,408,311 B1 | 6/2002 | Baisley et al. | |
| 6,845,380 B2 | 1/2005 | Su et al. | |
| 6,941,521 B2 | 9/2005 | Lin et al. | |
| 7,080,325 B2 | 7/2006 | Treibach-Heck et al. | |
| 7,281,015 B2 * | 10/2007 | Brown et al. ........................ | 1/1 |
| 7,406,660 B1 | 7/2008 | Sikchi et al. | |
| 7,430,498 B2 | 9/2008 | Butterfield et al. | |
| 7,480,859 B2 | 1/2009 | Mani et al. | |
| 7,533,365 B1 | 5/2009 | Hogstrom et al. | |
| 2003/0167445 A1 | 9/2003 | Su et al. | |
| 2003/0237046 A1 | 12/2003 | Parker et al. | |
| 2005/0155027 A1 * | 7/2005 | Wei ................................ | 717/162 |
| 2005/0204281 A1 * | 9/2005 | Choate .......................... | 715/513 |
| 2008/0092109 A1 | 4/2008 | Kinnucan et al. | |
| 2009/0018806 A1 | 1/2009 | Butterfield et al. | |
| 2009/0064205 A1 | 3/2009 | Fay et al. | |
| 2009/0172042 A1 | 7/2009 | Bracha et al. | |
| 2009/0265615 A1 * | 10/2009 | Hatori et al. ................... | 715/239 |

OTHER PUBLICATIONS

Anas Abouzahra, et al., "A Practical Approach to Bridging Domain Specific Languages with UML profiles", XP007907271, http://www.sciences.univ-nantes.fr/lina/atl/bibliography/MDSD05_1, 8 pages, Oct. 16, 2005.
PCT, Notification of Transmittal of the International Search Report and the Written Opinion of the International Searching Authority, or the Declaration, International Application No. PCT/US2009/052341, 13 pages, Nov. 25, 2009.
"International Application Serial No. PCT/US2009/052341, International Preliminary Report on Patentability mailed Feb. 1, 2011", 7 pgs.
"International Application Serial No. PCT/US2009/052341, International Search Report mailed Nov. 25, 2009", 3 pgs.
"International Application Serial No. PCT/US2009/052341, Written Opinion mailed Nov. 25, 2009", 6 pgs.
Anas, Abouzahra, et al., "A Practical Approach to Bridging Domain Specific Languages with UML profiles", Internet Citation, [Online]. Retrieved from the Internet URL:<http://www.sciences.univ-nantes.fr/lin a/atl/bibliography/MDSD05_1>, (Oct. 16, 2005), 8 pgs.

* cited by examiner

*Primary Examiner* — Elias Mamo
(74) *Attorney, Agent, or Firm* — Schwegman Lundberg & Woessner, P.A.

(57) ABSTRACT

According to one embodiment, an architecture tailoring system includes an architecture tailoring tool coupled to multiple architecture tools that each generates architectures according to its native architecture definition. Architecture tailoring tool receives an architecture from an architecture tool generated according to its native architecture definition and convert at least a portion of the architecture to conform a different architecture definition. The converted portion may then be exported to another architecture tool that is configured to manipulate the converted portion of the architecture according to its native architecture definition.

23 Claims, 5 Drawing Sheets

ARCHITECTURE TAILORING SYSTEM

RELATED APPLICATIONS

This application claims priority to U.S. Provisional Patent Application Ser. No. 61/137,592, entitled "ARCHITECTURE BUSINESS TAILORING TOOL," which was filed on Jul. 31, 2008.

TECHNICAL FIELD OF THE DISCLOSURE

This disclosure generally relates to architecture design tools, and more particularly to converting architectures to different types of architecture definitions.

BACKGROUND OF THE DISCLOSURE

Architectures represent systems and may be used to visualize the core aspects of the system or categorize elements of the systems according to their interactions with one another. The Department of Defense Architecture framework (DoDAF) has been established to provide a common framework for systems used by the United States Department of Defense (DoD). The DoDAF defines a common taxonomy and ontology that may be used to describe elements of the system and the rules regarding use of the elements and their relationships with one another. Accordingly, architectures generated according to the DoDAF may be readily shared among organizations that use DoDAF.

SUMMARY OF THE DISCLOSURE

According to one embodiment, an architecture tailoring system includes an architecture tailoring tool coupled to multiple architecture tools that each generates architectures according to their native architecture definitions. Architecture tailoring tool receives an architecture from an architecture tool generated according to its native architecture definition and converts at least a portion of the architecture to conform a different architecture definition. The converted portion may then be exported to another architecture tool that is configured to manipulate the converted portion of the architecture according to its native architecture definition.

Some embodiments of the disclosure may provide numerous technical advantages. For example, one embodiment of the architecture tailoring system may provide re-use of architectures generated according to a particular architecture definition. Architectures generated according to a particular architecture definition may include relatively detailed information about its constituent artifacts that may be useful for other types of architecture tools. The architecture tailoring system according to the teachings of the present disclosure provides a technique for converting some or all of these artifacts such that useful information associated with the artifacts may be selectively transferred to another architecture tool.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Architecture frameworks, such as the Department of Defense architecture framework (DoDAF), federal enterprise architecture framework (FEAF), treasury enterprise architecture framework (TEAF), the open group architecture framework (TOGAF), Zachmann Framework, Ministry of Defense Architecture Framework (MoDAF), are used in defense and commercial market places. The DoDAF, for example, has been developed by the Department of Defense (DoD) to enhance interoperability and communication among various organizations. For example, the DoDAF may be used to generate an architecture describing actions that may be used by military personnel in response to threats from enemy combatants. The architecture may include artifacts representing specific types of equipment used by the military personnel. Types of artifacts may include armament, surveillance equipment, or other devices that may used to perform the modeled actions.

Various computer-implemented tools have been developed to generate architectures according to the DoDAF. Known implementations of these tools, however, may not provide sufficient mapping of architectures to other architectures generated according to differing types of architecture definitions.

Figure 1:
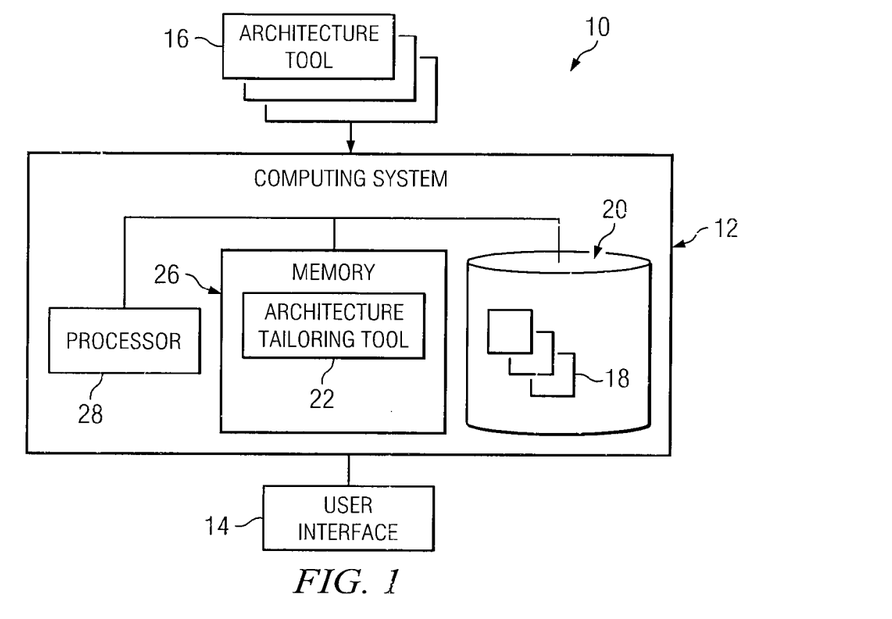
FIG. 1 is a diagram showing one embodiment of an architecture tailoring system according to the teachings of the present disclosure.

FIG. 1 is a diagram showing one embodiment of an architecture tailoring system 10 according to the teachings of the present disclosure. Architecture tailoring system 10 includes a computing system 12 that is coupled to a user interface 14 and one or more architecture tools 16 that generate architectures 18 according to different architecture definitions. Architecture tailoring system 10 also includes a mass storage device 20 for storing architectures 18. Architecture tailoring tool 22 includes instructions stored in a memory 26 and executed by a processor 28 of computing system 12.

Architectures 18 may each be associated with a particular architecture definition. The architecture definition describes the architecture framework of the architecture 18 and includes a particular structure of data used by its associated architecture tool 16. The architecture definition may also include the formatting of data exported from its associated architecture tool 16 or imported into its associated architecture tool 16.

Computing system 12 executes an architecture tailoring tool 22 that imports an architecture 18 generated by one architecture tool 16 according to a source architecture definition and maps at least a portion of the imported architecture 18 to another architecture 18 formatted according to a destination architecture definition. The converted architecture 18 may then be stored in mass storage device 20 of computing system 12 and/or exported to another suitable architecture tool 16 that is configured to read and manipulate the architecture according to the destination architecture definition.

Architecture tools 16 may include any suitable computer-implemented tool that generates architectures according to an architecture definition, such as the DoDAF, an architecture data model (CADM), or an Agent Systems Reference Model (ASRM). An architecture definition including a software modeling language, may be used to generate executable software. Architecture definitions of this type may include a unified modeling language (UML), an object role modeling (ORM) language, and a systems modeling language (sysML) software modeling language.

Certain embodiments of architecture tailoring tool 22 may provide an advantage over known architecture tools in that details of architectures 18 generated according to a particular architecture definition may be converted to a different architecture definition for use by other architecture tools 16. For example, a particular architecture 18 may be generated by an architecture tool 16 according to an architecture definition including the DoDAF. Architecture tailoring tool 22, may map artifacts of the source architecture 18 to those of a destination architecture 18 such that the destination architecture 18 may be imported into a suitable architecture tool 16.

Computing system 12 may be of any suitable type. For example, computing system 12 may be a network coupled computing system or a stand-alone computing system. A network computing system may be a number of computers coupled together via a network, such as a local area network (LAN), a metropolitan area network (MAN), a wide area network (WAN), or an enterprise network. A stand-alone computing system may be any suitable computing system, such as a personal computer, laptop computer, or mainframe computer capable of executing instructions necessary to implement architecture tailoring tool 22.

User interface 14 displays artifacts of architectures 18 for view by a user. User interface 14 may include an user output device such as a cathode ray tube (CRT), liquid crystal display (LCD), or a plasma display panel (PDP) that provides visual information. User interface 14 may also include a keyboard, mouse, console button, or other similar type user input device for providing user input to the architecture tailoring tool 22.

Figure 2:
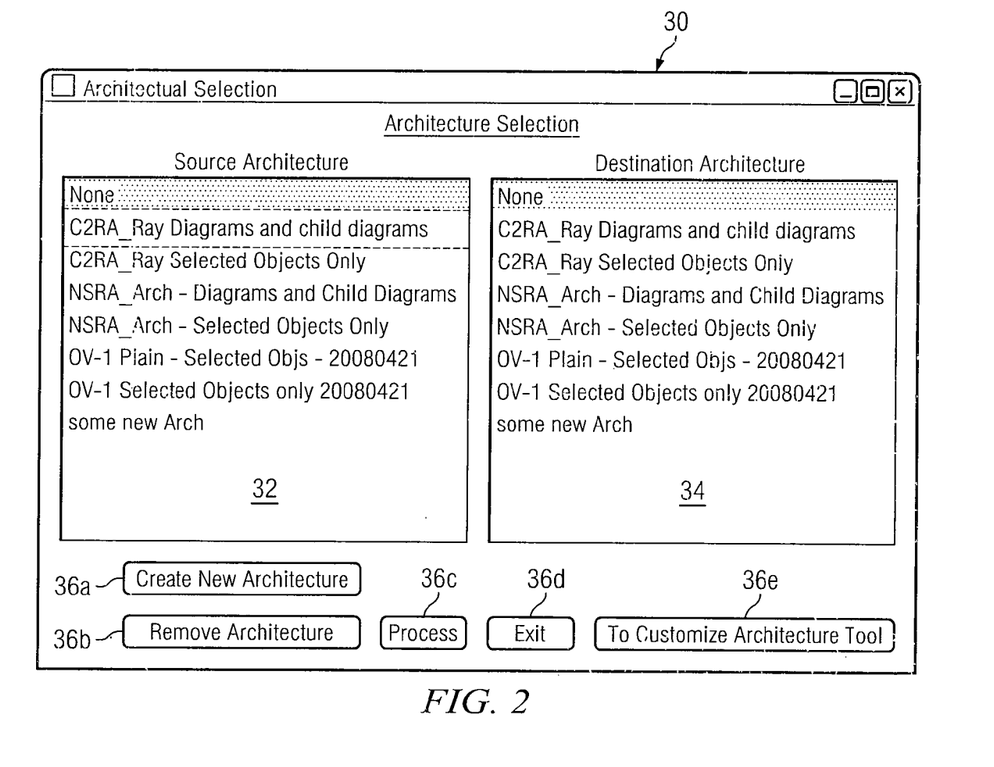
FIG. 2 is an example screenshot showing one embodiment of an architecture selection window that may be displayed by the architecture tailoring tool of FIG. 1 on its user interface.

FIG. 2 is an example screenshot showing one embodiment of an architecture selection window 30 that may be displayed by architecture tailoring tool 22 of FIG. 1 on user interface 14. Architecture selection window 30 includes a source architecture selection portion 32, a destination architecture selection portion 34, and several control buttons 36. Architecture tailoring tool 22 displays titles of existing architectures 18 stored in mass storage device 20 in source architecture selection portion 32 and destination architecture selection portion 34.

Control buttons 36 include a "create new architecture" button 36*a*, a "remove architecture" button 36*b*, a "process" button 36*c*, an "exit" button 36*d*, and a "customize architecture tool" button 36*e*. "Remove architecture" button 36*b* causes architecture tailoring tool 22 to remove a particular architecture 18 that has been selected in the source architecture selection portion 32 or the destination architecture selection portion 34. Selecting "exit" button 36*d* causes execution of architecture tailoring tool 22 to terminate.

Selecting "create new architecture" button 36*a* causes architecture tailoring tool 22 to generate a new architecture 18 that may be associated with a particular tool customization file 90 (FIG. 5A) stored in memory 26. In one embodiment, tool customization file 90 includes a number of custom architecture definitions defining how artifacts will be generated in the new architecture 18. For example, a new architecture 18 may be generated according to the DoDAF architecture framework using a particular type of architecture tool 16 using "create new architecture" button 36*a*. Upon its selection, architecture tailoring tool 22 generates a blank architecture 18 suitable for use by the particular architecture tool 16 and extracts attributes from tool customization files 90 that will be used for subsequent artifacts generated in the blank architecture 18.

Figure 3:
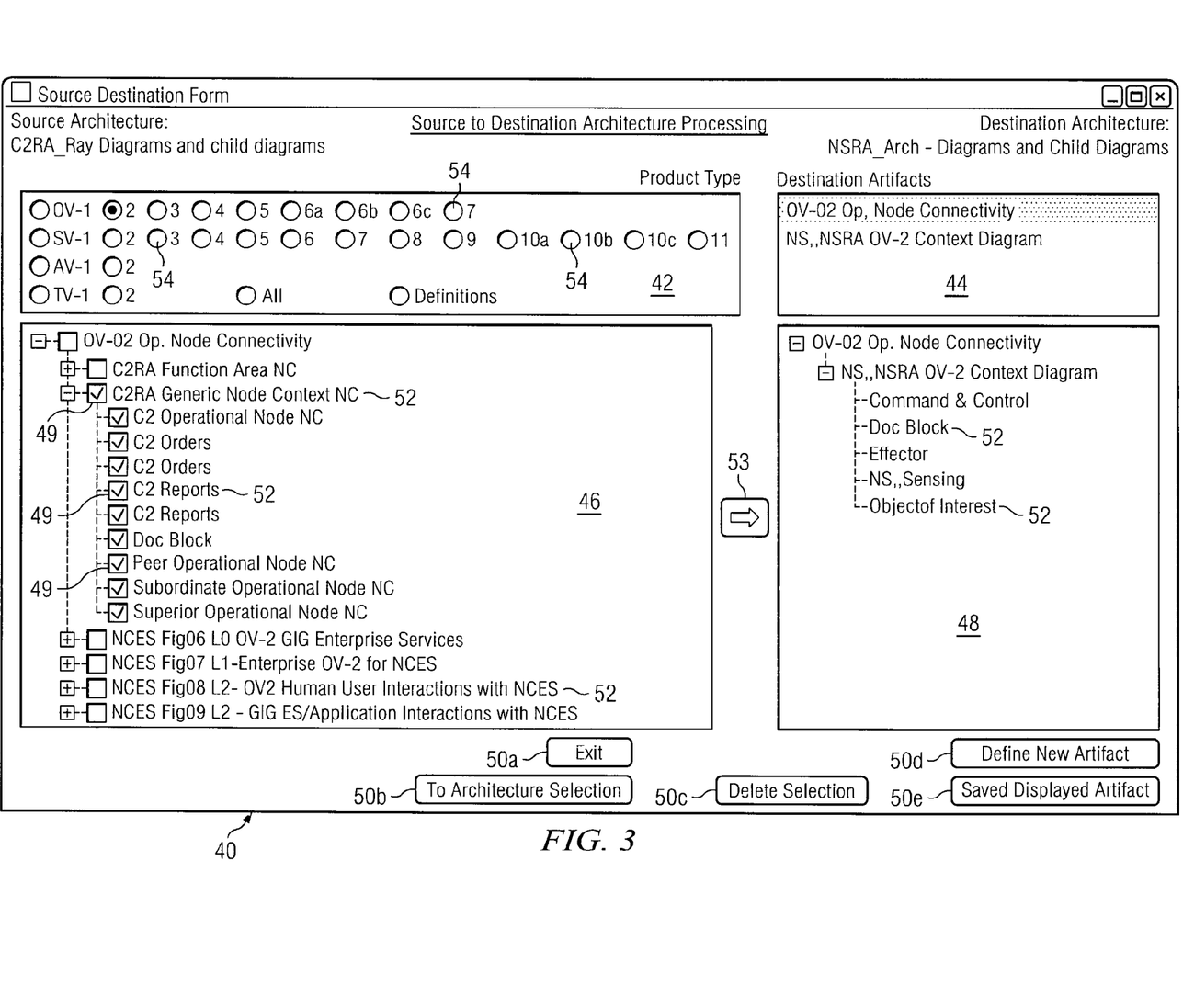
FIG. 3 is an example screenshot showing one embodiment of a processing window that may be displayed by the architecture tailoring tool of FIG. 1.

FIG. 3 is an example screenshot showing one embodiment of processing window 40 that may be displayed by architecture tailoring tool 22 on user interface 14 in response to selection of "process" button 36*c*. Processing window 40 includes a product type window portion 42, a destination artifacts summary window portion 44, a source architecture window portion 46, a destination architecture window portion 48, several control buttons 50, and a selection button 53.

Source architecture window portion 46 displays the various artifacts 52 of the source architecture 18 selected in source architecture portion 32 (FIG. 2) in a hierarchal format and is each associated with a selection box 49. As an example in which the architecture 18 respresents an armored personnel carrier, artifacts 52 of architecture 18 may represent its constituent elements, such as its drive train, armament, and/or control circuitry, maintenance procedures, or other documentation associated with development and construction of the armored personnel carrier.

Destination window portion 48 displays the various artifacts 52 of destination architecture 18 selected in destination architecture portion 34 (FIG. 2) in a hierarchal format. Artifacts 52 of the source architecture 18 represent particular components of source architecture 18. Artifacts 52 displayed in the destination architecture window portion 48 are those artifacts 52 and/or other components selected by actuation of selection button 53. Once articfacts 52 in source architecture 18 are selected via selection boxes 49, actuation of selection button 53 causes architecture tailoring tool 22 to display the selected artifacts 52 from the source architecture window portion 46 in the destination architecture window portion 48.

Control buttons 50 include an "exit" button 50*a*, an "to architecture selection" button 50*b*, a "delete selection" button 50*c*, a "define new artifact" button 50*d*, and a "save displayed artifact" button 50*e*. Selecting "exit" button 50*a* causes execution of architecture tailoring tool 22 to terminate. Selecting "architecture selection" button 50*b* causes architecture tailoring tool 22 to display architecture selection window 30 (FIG. 2). Selecting "delete selection" button 50*c* causes architecture tailoring tool 22 to delete those artifacts 52 that have been selected in destination artifacts window portion 48. Thus, some, none, or all of the available artifacts 52 in source architecture window portion 46 may be configured for re-use or conversion by architecture tailoring tool 22. Selecting "save displayed artifact" button 50*e* causes architecture tailoring tool 22 to load the selected artifacts of source architecture 18 to destination architecture 18.

Product type window portion 42 includes several radio buttons 54 corresponding to various artifacts 52 stored in source architecture 18. Selecting a particular radio button 54 causes architecture tailoring tool 22 display its associated artifacts(s) 52 in source architecture window portion 46.

Using radio buttons 54, some, none, or all elements of source architecture 18 may be configured by the user to be loaded and/or converted to the destination architecture 18. As shown, the "OV-2" radio button 54 is selected, thus the OV-2 artifact 52 and its associated artifacts 52 are displayed in source architecture window portion 46. Source architecture window portion 46 includes a menu-selectable list of artifact types that are resident in the existing architectures available from source architecture window portion 32 (FIG. 2). In the particular example screenshot shown, destination architecture window portion displays two artifact types into which the selected element of source architecture 18 may be loaded to the destination architecture 18 for re-use or converted into a specified format to be used by an architecture tool 16 that differs from the one generated by the source architecture 18.

Figure 4:
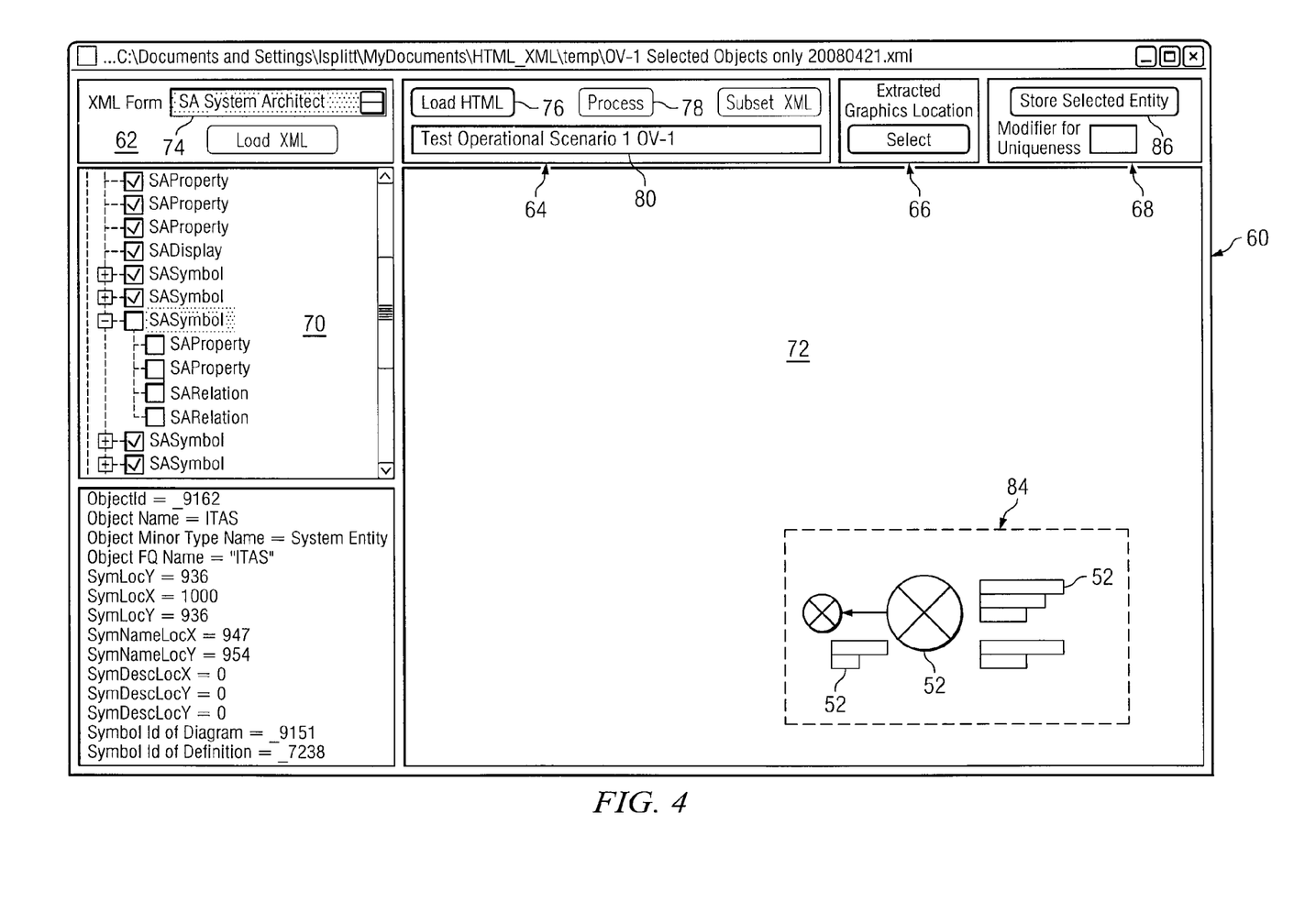
FIG. 4 is an example screenshot showing one embodiment of an artifact definition window that may be displayed by architecture tailoring tool of FIG. 1.

FIG. 4 is a screenshot showing one embodiment of an artifact definition window 60 that may be displayed by architecture tailoring tool 22 on user interface 14. Artifact definition window 60 may be displayed by architecture tailoring tool 22 in response to actuating "define new artifact" button 50d. Artifact definition window 60 includes an architecture origination portion 62, an execution window portion 64, a graphics location window portion 66, a storage window portion 68, a results window portion 70, and an HTML window portion 72.

Architecture origination portion 62 includes a context menu 74 that may be used to select the type of architecture tool 16 from which the architecture 18 originated. Execution window portion 64 includes a "load HTML" button 76, a "process" button 78, and a "architecture identification" field 80. Selecting "load HTML" button 76 causes architecture tailoring tool 22 to load the received architecture 18 in HTML window portion 72. Selecting "process" button 78 causes architecture tailoring tool 22 to generate artifacts from the architecture 18 in extensible markup language (XML) format and display the generated artifacts in results window portion 70.

Artifact definition window 60 may be used to recover information from artifacts 52 of architecture models 18 structure according to a hypertext markup language (HTML) format and/or an extensible markup language (XML) format and convert them to be structured according to an XML format suitable for use by destination architecture tool 16. In a particular embodiment, source architecture tool 16 is a SYSTEM ARCHITECT™ executable software application available from International Business Machines, Incorporated (IBM), located in Endicott, N.Y. The SYSTEM ARCHITECT™ executable software exports generated architectures in several differing protocols, including a HTML format. Using an architecture 18 having a HTML format, artifact definition window 60 associates artifacts to one another in relation to their general proximity in HTML window portion 72. For example, artifacts 52 as shown may have a particular relation to one another according to their relative location in HTML window portion 72. Architecture tailoring tool 22 assigns this relation among the various artifacts 52 according to their relative location to one another.

In one embodiment, architecture tailoring tool 22 includes a graphics location window portion 84 that enables modification of a particular selection region 84 on HTML window portion 72. Selection region 84 may be adjusted on user interface 14 to encompass some, none, or all artifacts 52 displayed on user interface 14. By modifying the selection region 84, architecture tailoring tool 22 may be instructed to assign relationships among neighboring artifacts 52 according to limits specified by selection region 84.

Storage window portion 68 includes a "store selected entity" button 86 that may be actuated to store the converted artifacts 52 and return operation to the processing window 40 as shown and described with respect to FIG. 3.

Modifications, additions, or omissions may be made to architecture tailoring system 10 without departing from the scope of the disclosure. The components of architecture tailoring system 10 may be integrated or separated. For example, one or more architecture tools 16 may be executed on the same computing system 12 as architecture tailoring tool 22 or may be executed individually on another computing system. Moreover, the operations of architecture tailoring system 10 may be performed by more, fewer, or other components. For example, architecture tailoring tool 22 may include other windows that provide additional customization of artifacts 52 received from architecture tools 16. Additionally, operations of architecture tailoring tool 22 may be performed using any suitable logic comprising software, hardware, and/or other logic. As used in this document, "each" refers to each member of a set or each member of a subset of a set.

Figure 5A:
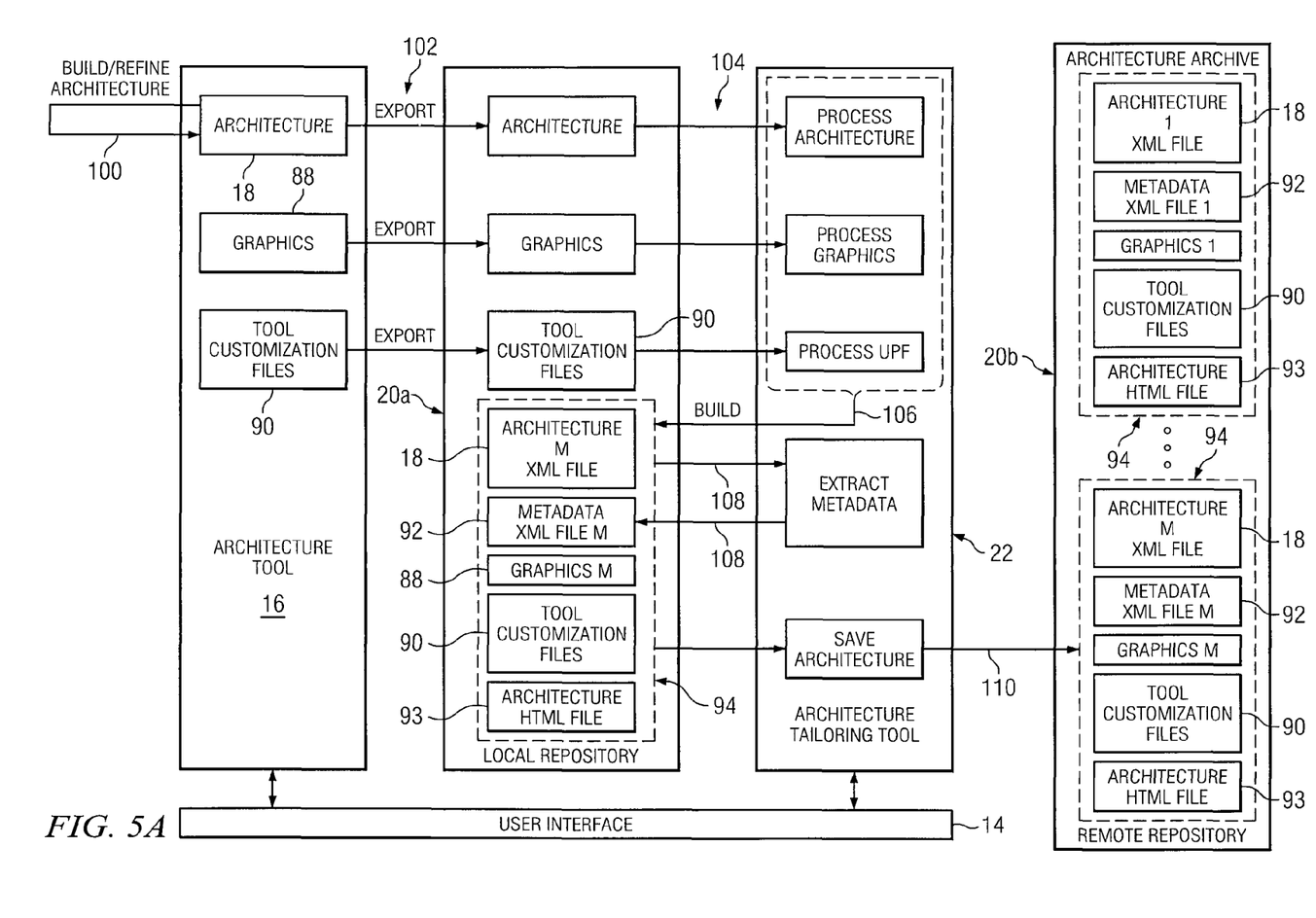
FIG. 5A is a functional flow diagram showing one embodiment of a process for converting an architecture conforming to one architectural specification to another architecture conforming to a different architecture definition that may be performed by the architecture tailoring tool of FIG. 1.

FIG. 5A is a functional flow diagram showing one embodiment of a process for converting an architecture 18 generated by a source architecture tool 16 to another architecture 18 conforming to a different architecture definition. In the particular embodiment shown, mass storage device 20 includes a local repository 20a for temporary storage of architecture 18 from source architecture tool 16 and a remote repository 20b for relatively long term storage of multiple architectures 18.

In one embodiment, architecture tailoring tool 22 may import elements such as graphic images and automatically modify tool customization file 90 to create an artifact 52 including the imported element. For example, an artifact 52 representing a military tank may be created by importing a graphic image representing a military tank into architecture tailoring tool 22. Archtecture tailoring tool 22 may then generate metadata associated with the graphic image according to the architecture format of architecture tool 16 or other information received from user interface 14. The metadata may include tags or labels used by architecture tool 16 for associating the generated artifact 52 with other artifacts 52 of the architecture 18.

At step 100, source architecture tool 16 is used to generate an architecture 18 according to its native architecture definition. In certain embodiments, source architecture tool 16 is the SYSTEM ARCHITECT™ executable software application. SYSTEM ARCHITECT™ generates architectures 18 according to various architecture frameworks, such as the DoDAF architecture framework.

At step 102, architecture tool 16 exports the generated architecture 18 and other associated files to a local repository 20a. The exported architecture 18 may be structured according to an HTML format or an XML format. In certain embodiments, the other files may include graphics files 88 and one or more tool customization files 90. Tool customization files 90 includes custom architecture definitions defining one or more artifacts of the converted portion of the source architecture. In certain embodiments, tool customization files 90 may include a USERPROPS.txt file associated with each generated architecture 18.

At step 104, architecture tailoring tool 22 accesses the generated architecture 18, associated graphics files 88, and tool customization files 90 from local repository 20a. In one embodiment, architecture tailoring tool 22 receives the architecture 18 from architecture tool 16 in a HTML format.

At step 106, architecture tailoring tool 22 loads and/or converts architecture 18 to another architecture 18. In one embodiment, architecture tailoring tool 22 creates the destination architecture 18 by either loading artifacts 52 to the destination architecture or converting artifacts 52 of architecture to a format suitable for use by the destination architecture tool 16.

The XML format provides a structure whereby the various artifacts of the generated architecture 18 may be imported into other types of architecture tools 16 in a relatively efficient manner. Architecture 18 may be converted to any suitable architecture definition such as described above with respect to FIG. 3.

At step 108, architecture tailoring tool 22 extracts metadata from various artifacts and generates a metadata file 92 that includes extracted metadata instances associated with the various artifacts 52 of architecture 18. Metadata stored in metadata file 92 may be useful for organizing and searching for certain artifacts from among a number of architectures 18 stored in remote repository 20*b*.

At step 110, architecture tailoring tool 22 stores the converted architecture 18 in remote repository 20*b*. In certain embodiments, remote repository 20*b* includes multiple architectures 18 that have been generated and stored by architecture tailoring tool 22 according to steps 102 through 110 using one or more differing types of architecture tools 16.

In one embodiment, the converted architecture 18 may be encapsulated in an architecture storage structure 94 that includes the converted architecture 18 and its associated architecture HTML file 93, metadata file 92, graphics files 88, and tool customization files 90. Architecture HTML File 93 may be included to store information describing an overview of architecture 18. In certain embodiments, information associated with the architecture 18 may be readily available for use by architecture tailoring tool 22 or other architecture tools 16 when accessed for refinement and/or conversion according to a different type of architecture definition.

Figure 5B:
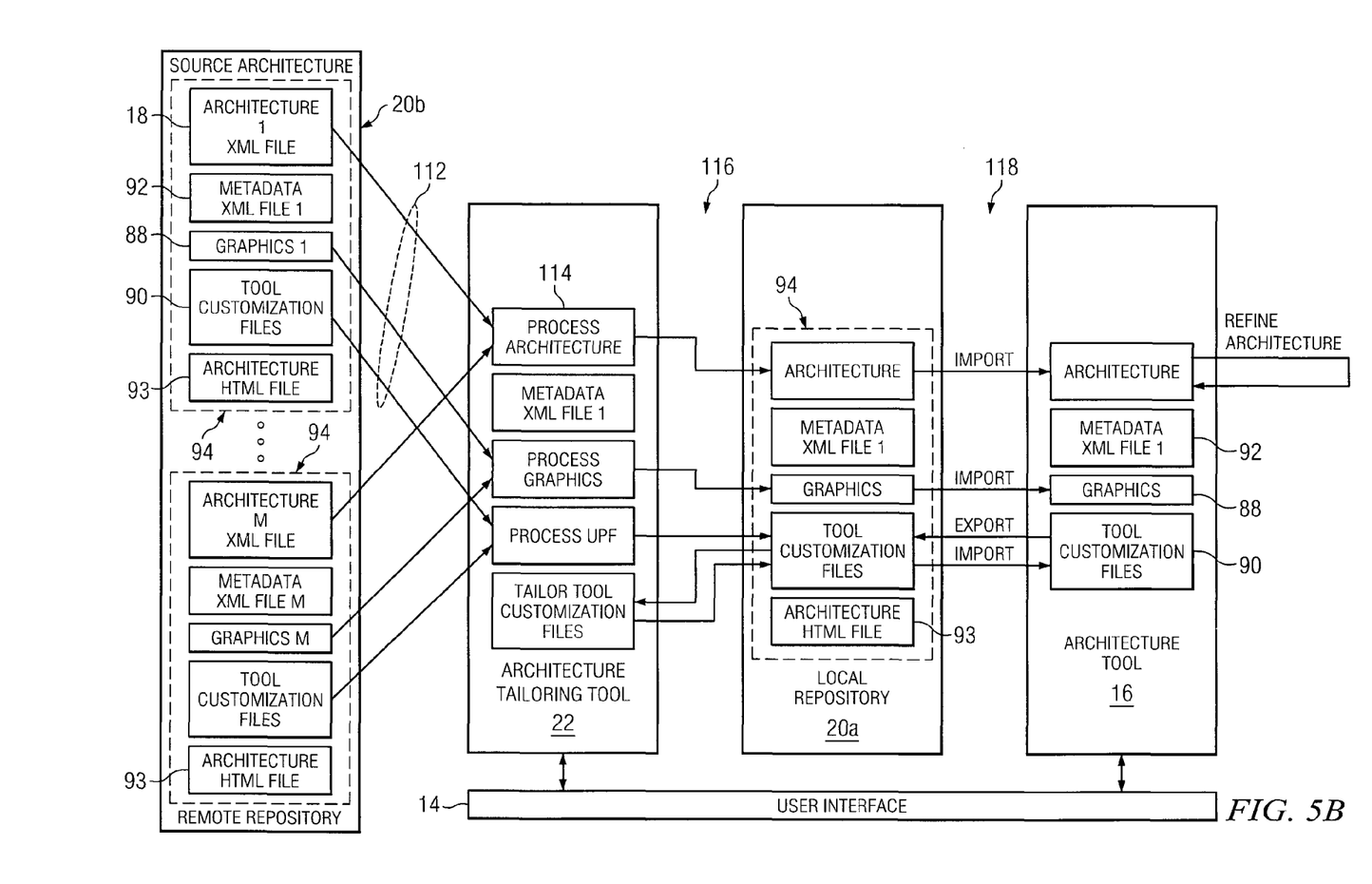
FIG. 5B is a functional flow diagram showing one embodiment of a process for importing the architecture to a destination architecture tool that may be performed by the architecture tailoring tool of FIG. 1.

FIG. 5B is a functional flow diagram showing one embodiment of a process for importing the architecture 18 to a destination architecture tool 16. Remote repository 20*b* includes multiple architectures 18 that have been generated and stored as described above with respect to FIG. 4A.

In step 112, architecture tailoring tool 22 receives one or more architectures 18 from remote repository 20*b*. In one embodiment, architecture tailoring tool 22 may receive multiple architectures 18 for use by destination architecture tool 16. For example, one particular architecture 18 may include information associated a particular piece of armament and another architecture 18 may include information associated with a platform onto which this armament is to be mounted. Thus, architecture tailoring tool 22 may provide re-use of generated architectures 18 by providing a technique for importing multiple architectures 18 and combining them into a single architecture 18 in some embodiments.

In step 114, architecture tailoring tool 22 processes the one or more received architectures 18 such that the derived architecture is suitable for use by destination architecture tool 16. That is, architecture tailoring tool 22 may convert the architecture 18 according to an architecture definition that is native to destination architecture tool 16. In one embodiment in which multiple architectures 18 are received, architecture tailoring tool 22 may include a process for resolving naming conflicts among the various artifacts 52 that may exist among the multiple architectures 18 imported by architecture tailoring tool 22. In another embodiment, architecture tailoring tool 22 may process the received architectures 18 by tailoring the tool customization files 90 associated with the architecture 18.

In step 116, architecture tailoring tool 22 stores the tailored architecture 18 in local repository 20*a*, and architecture tool 16 imports architecture 18 and refines its architecture as needed in step 118.

Modifications, additions, or omissions may be made to the process described above without departing from the scope of the disclosure. The method may include more, fewer, or other acts. For example, architecture tailoring tool 22 may generate a "blank" architecture 18 in which no artifacts 52 exist and store in mass storage device 20. The "blank" architecture 18 may include one or more tool customization files 90 including default values for artifacts 52 generated in the future. Using this "blank" architecture 18, various personnel within an organization may generate architectures 18 using a common set of attributes for artifacts 52 in a manner that standardizes the generation and use of architectures by the organization.

Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. An architecture tailoring system comprising:
an architecture tailoring tool comprising memory storing instructions executable on a computing system, the architecture tailoring tool coupled to a first architecture tool operable to generate a first architecture according to a first architecture definition and a second architecture tool operable to generate a second architecture according to a second architecture definition different from the first architecture definition, the architecture tailoring tool operable to:
import the first architecture from the first architecture tool;
convert at least a portion of the first architecture to conform to the second architecture definition;
generate one or more customization files tailored to the converted portion of the first architecture, wherein the one or more customization files include custom architecture definitions defining one or more artifacts of the converted portion of the first architecture; and
export the converted portion of the first architecture and the customization files to the second architecture tool.

2. The architecture tailoring system of claim 1, the first architecture definition or the second architecture definition comprising a software modeling language.

3. The architecture tailoring system of claim 2, the software modeling language comprising a unified modeling language (UML) model.

4. The architecture tailoring system of claim 1, the architecture tailoring tool coupled to a mass storage device and operable to:
store the converted portion of the first architecture in an architecture storage structure in the mass storage device, the architecture storage structure including the one or more customization files, the one or more customization files providing one or more custom architecture definitions defining one or more artifacts of the converted portion of the first architecture.

5. The architecture tailoring system of claim 1, the architecture tailoring tool operable to convert the portion of the first architecture from a hypertext markup language (HTML) format to an extensible markup language (XML) format.

6. The architecture tailoring system of claim 1, the architecture tailoring tool operable to convert the portion of the first architecture from an XML format to the second architecture having the extensible markup language XML format.

7. The architecture tailoring system of claim 1, the first architecture comprising a plurality of artifacts operable to be displayed on a user interface, the architecture tailoring tool operable to associate artifacts with one another according to their relative proximity to each other on the user interface.

8. The architecture tailoring system of claim 1, the architecture tailoring tool further operable to convert the converted portion of the first architectural model to conform to the first architecture definition.

9. The architecture tailoring system of claim 1, the architecture tailoring tool coupled to a mass storage device and operable to:
generate a blank architecture according to the first architecture definition or the second architecture definition, the blank architecture being void of any artifacts and associated with one or more custom architecture definitions operable to define the creation of one or more artifacts in the blank architecture; and
store the blank architecture and the one or more custom architecture definitions within the one or more customization files upon the mass storage device.

10. The architecture tailoring system of claim 1, the architecture tailoring tool coupled to a mass storage device and operable to:
generate a metadata file comprising one or more metadata instances corresponding to one or more artifacts of the converted portion of the first architecture; and
store the converted portion of the first architecture and the metadata file in an architecture storage structure in the mass storage device.

11. A method comprising:
importing a first architecture from a first architecture tool, the first architecture generated according to a first architecture definition;
converting at least a portion of the first architecture to conform to a second architecture definition;
generating one or more customization files tailored to the converted portion of the first architecture, wherein the one or more customization files include custom architecture definitions defining one or more artifacts of the converted portion of the first architecture; and
exporting the converted portion of the first architecture to a second architecture tool that is operable to manipulate the converted portion of the first architecture according to the second architecture definition.

12. The method of claim 10, the first architecture definition or the second architecture definition comprising a software modeling language.

13. The method of claim 11, the software modeling language comprising a unified modeling language (UML) model.

14. The method of claim 10, further comprising:
storing the converted portion of the first architecture in an architecture storage structure in a mass storage device, the architecture storage structure including the one or more customization files, the one or more customization files providing one or more custom architecture definitions defining one or more artifacts of the converted portion of the first architecture.

15. The method of claim 10, further comprising:
converting the portion of the first architecture from a hypertext markup language (HTML) format to an extensible markup language (XML) format.

16. The method of claim 10, further comprising:
converting the portion of the first architecture from a extensible markup language (XML) format to the second architecture having the extensible markup language (XML) format.

17. The method of claim 10, further comprising:
displaying a plurality of artifacts of the first architecture on a user interface; and
associating artifacts with one another according to their relative proximity to each other on the user interface.

18. The method of claim 10, further comprising:
converting the converted portion of the first architectural model to conform to the first architecture definition.

19. The method of claim 10, further comprising:
generating a blank architecture according to the first architecture definition or the second architecture definition, the blank architecture being void of any artifacts and associated with one or more custom architecture definitions operable to define the creation of one or more artifacts in the blank architecture; and
storing the blank architecture and the one or more custom architecture definitions within the one or more customization files upon a mass storage device.

20. The method of claim 10, further comprising:
generating a metadata file comprising one or more metadata instances corresponding to one or more artifacts of the converted portion of the first architecture; and
storing the converted portion of the first architecture and the metadata file in an architecture storage structure in a mass storage device.

21. A non-transitory computer-readable storage medium including instructions which, when executed by a processor, is operable to:
import a first architecture from a first architecture tool, the first architecture generated according to a first architecture definition;
convert at least a portion of the first architecture to conform to a second architecture definition;
generate one or more customization files tailored to the converted portion of the first architecture, wherein the one or more customization files include custom architecture definitions defining one or more artifacts of the converted portion of the first architecture; and
export the converted portion of the first architecture to a second architecture tool that is operable to manipulate the converted portion of the first architecture according to the second architecture definition.

22. An architecture tailoring system comprising:
an architecture tailoring tool comprising memory storing instructions executable on a computing system, the architecture tailoring tool coupled to a first architecture tool operable to generate a first architecture according to a first architecture definition and a second architecture tool operable to generate a second architecture according to a second architecture definition different from the first architecture definition, the architecture tailoring tool operable to:
import the first architecture from the first architecture tool;
convert at least a portion of the first architecture to conform to the second architecture definition; and
export the converted portion of the first architecture to the second architecture tool;
wherein the first architecture definition or the second architecture definition includes an architecture framework that is one of: a Department of Defense Architecture Framework (DoDAF) architecture framework, a Federal Enterprise Architecture Framework (FEAF), a Treasury Enterprise Architecture Framework (TEAF), a The Open Group Architecture Framework (TOGAF), a Zachmann Framework, or a Ministry of Defense Architecture Framework (MoDAF).

23. A method comprising:

importing a first architecture from a first architecture tool, the first architecture generated according to a first architecture definition;

converting at least a portion of the first architecture to conform to a second architecture definition; and exporting the converted portion of the first architecture to a second architecture tool that is operable to manipulate the converted portion of the first architecture according to the second architecture definition;

wherein the first architecture definition or the second architecture definition includes one of: a Department of Defense Architecture Framework (DoDAF) architecture framework, a Federal Enterprise Architecture Framework (FEAF), a Treasury Enterprise Architecture Framework (TEAF), a The Open Group Architecture Framework (TOGAF), a Zachmann Framework, or a Ministry of Defense Architecture Framework (MoDAF).

\* \* \* \* \*